(12) United States Patent
Dhong et al.

(10) Patent No.: US 7,617,338 B2
(45) Date of Patent: Nov. 10, 2009

(54) MEMORY WITH COMBINED LINE AND WORD ACCESS

(75) Inventors: Sang Hoo Dhong, Austin, TX (US); Brian King Flachs, Georgetown, TX (US); Harm Peter Hofstee, Austin, TX (US); Osamu Takahashi, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 646 days.

(21) Appl. No.: 11/050,040

(22) Filed: Feb. 3, 2005

(65) Prior Publication Data

US 2006/0179176 A1 Aug. 10, 2006

(51) Int. Cl.
*G06F 13/28* (2006.01)
*G06F 5/00* (2006.01)

(52) U.S. Cl. .......................... 710/22; 710/36
(58) Field of Classification Search .................. 710/22, 710/36

See application file for complete search history.

(56) References Cited

U.S. PATENT DOCUMENTS

| | | | | |
|---|---|---|---|---|
| 4,912,632 | A * | 3/1990 | Gach et al. ..................... 710/28 |
| 4,918,587 | A * | 4/1990 | Pechter et al. .............. 711/218 |
| 4,929,246 | A * | 5/1990 | Sinofsky ........................ 606/8 |
| 5,446,845 | A * | 8/1995 | Arroyo et al. ............... 710/307 |
| 5,669,013 | A * | 9/1997 | Watanabe et al. .............. 710/5 |
| 5,761,478 | A * | 6/1998 | Chen et al. .................. 711/172 |
| 6,341,318 | B1 * | 1/2002 | Dakhil ........................ 710/23 |
| 6,351,784 | B1 | 2/2002 | Neal et al. ................... 710/128 |
| 6,775,727 | B2 * | 8/2004 | Moyer ......................... 710/113 |
| 2002/0078268 | A1 * | 6/2002 | Lasserre ....................... 710/22 |
| 2002/0087845 | A1 * | 7/2002 | Dowling ..................... 712/228 |
| 2003/0229734 | A1 * | 12/2003 | Chang et al. .................. 710/36 |
| 2004/0260881 | A1 * | 12/2004 | Chauvel et al. ............. 711/128 |

OTHER PUBLICATIONS

Ackland, et al., A Single-Chip, 1.6-Billion, 16-b MAC/s Multiprocessor DSP, Mar. 3, 2000, IEEE Journal of Solid-State Circuits, vol. 35, No. 3, pp. 412-424.*
Pahl, et al., Maximizing Data Transfer Efficiency with C5000 DMA Controller, Sep. 12, 2001, Texas Instrument, pp. 1- 58.*
Horel, et al., UltraSPARC-III: Designing Third-Generation 64-Bit Performance, May-Jun. 1999, IEEE Micro, pp. 73-85.*
Dominic Herity, Network Processor Programming, Jul. 31, 2001, Embedded Systems Design.*

* cited by examiner

*Primary Examiner*—Henry W.H. Tsai
*Assistant Examiner*—Hyun Nam
(74) *Attorney, Agent, or Firm*—VanLeeuwen & VanLeeuwen; Matthew B. Talpis (57) ABSTRACT

A system for a processor with memory with combined line and word access is presented. A system performs narrow read/write memory accesses and wide read/write memory accesses to the same memory bank using multiplexers and latches to direct data. The system processes 16 byte load/sore requests using a narrow read/write memory access and also processes 128 byte DMA and instruction fetch requests using a wide read/write memory access. During DMA requests, the system writes/reads sixteen DMA operations to memory on one instruction cycle. By doing this, the memory is available to process load/store or instruction fetch requests during fifteen other instruction cycles.

20 Claims, 11 Drawing Sheets

MEMORY WITH COMBINED LINE AND WORD ACCESS

BACKGROUND OF THE INVENTION

1. Technical Field

The present invention relates in general to a system and method for a memory with combined line and word access. More particularly, the present invention relates to a system and method for a processor to perform a narrow memory access and a wide memory access to the same memory space.

2. Description of the Related Art

Circuit designers are often faced with deciding between device performance and device cost. A large portion of a device's cost corresponds with the amount of silicon area that its design requires. Since a large percentage of a device's silicon area is used for memory, a circuit designer pays particular attention to what memory cell type to use in a circuit design so that the memory meets performance requirements, but is not overly large as to unnecessarily increase device cost.

Existing art typically uses a single port memory cell type or a dual port memory cell type. The single port memory cell type is the smaller of the two and, therefore, minimizes a device's cost. However, the single port memory blocks load-store access during reload operations, thus sacrificing performance. The dual port memory cell type has the better performance of the two because a processor may write to and read from the memory simultaneously. However, the dual port memory cell type is the larger of the two, which increases device cost. A challenge found is that when a circuit designer chooses one of these memory cell types, the circuit designer typically either sacrifices performance or increases device cost.

Furthermore, static random access memory (SRAM) is typically coupled to conventional microprocessors for use as a cache. During operation, the cache is typically loaded with new data at times when the processor requires data or instructions other than those that are in the cache. As a result, the processor's program stops at a particular point because an instruction cannot be completed until the opcode or data is loaded into the SRAM and available to the processor.

What is needed, therefore, is a system and method for increased memory performance while, at the same time, minimizing the amount of silicon area that the memory requires in order to minimize a device's cost.

SUMMARY

It has been discovered that the aforementioned challenges are resolved using a system and method that performs narrow read/write memory accesses and wide read/write memory accesses to the same memory bank. The system processes 16 byte load/store requests using a narrow read/write memory access and also processes 128 byte DMA requests and instruction fetch requests using a wide read/write memory access.

A system uses multiplexers and latches to support the two different memory access types. While processing a "store" request, a write multiplexer is configured to receive 16 bytes of store data from a processor core. The 16 bytes of store data are loaded into a memory using a narrow write memory access. While processing a "load" request, a load multiplexer is configured to receive 16 bytes of load data from the memory and provide the load data to the processor core.

Instruction fetch requests and DMA requests are performed using wide memory accesses (e.g. 128 bytes of data). While processing an instruction fetch request, a read multiplexer is configured to receive 128 bytes of instruction fetch data from the memory and provide the data to a read latch. In turn, the processor core retrieves the instruction fetch data from the read latch. By fetching 128 bytes at a time, such as 32 instructions in a 32-bit (instruction set) RISC architecture, the number of times the memory is accessed for instruction fetching is minimized.

In order to maximize system performance, processing DMA requests entails reading and writing multiple DMA data from/to memory in one instruction cycle. A single DMA read or write operation includes sixteen processor cycles worth of DMA data. This invention uses a write accumulation buffer and the read latch to accumulate and store the DMA operations such that the memory bank is accessed one time every sixteen instruction cycles for DMA requests. During DMA write operations, a DMA unit sends DMA write data (8 bytes) to the write accumulation buffer. The write accumulation buffer stores the DMA write data, and determines whether it has received sixteen consecutive DMA write operations.

Once the write accumulation buffer receives sixteen consecutive DMA write operations, the system schedules a wide write memory access to the memory. In turn, the write multiplexer is configured to receive DMA data from the write accumulation buffer, which is loaded into the memory during a single instruction cycle.

A similar scenario exists for DMA read operations. During DMA read operations, the system configures the read multiplexer to receive a wide read memory access from the memory and load it into the read latch. The wide read memory access includes sixteen instruction cycles worth of DMA data. In turn, the read latch provides the DMA data to the DMA unit over sixteen different instruction cycles. Therefore, even if DMA read operations and write operations are proceeding at maximum bandwidth, the system occupies two out of sixteen instruction cycles to access the memory, and the remaining fourteen instruction cycles remain available to the system for load and store operations and instruction fetching.

In order to save wire tracks between memory arrays and accumulation latches, the invention described herein is capable of a memory configuration that splits the read accumulation latch into two latches of 64 bytes each, thereby having an additional advantage that fetches may be aligned to 64 byte rather than 128 byte boundaries and thus, guaranteeing that each fetch results in at least 64 bytes plus 4 bytes worth of valid instructions that are independent of the entry point (instruction branch target).

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

Figure 1:
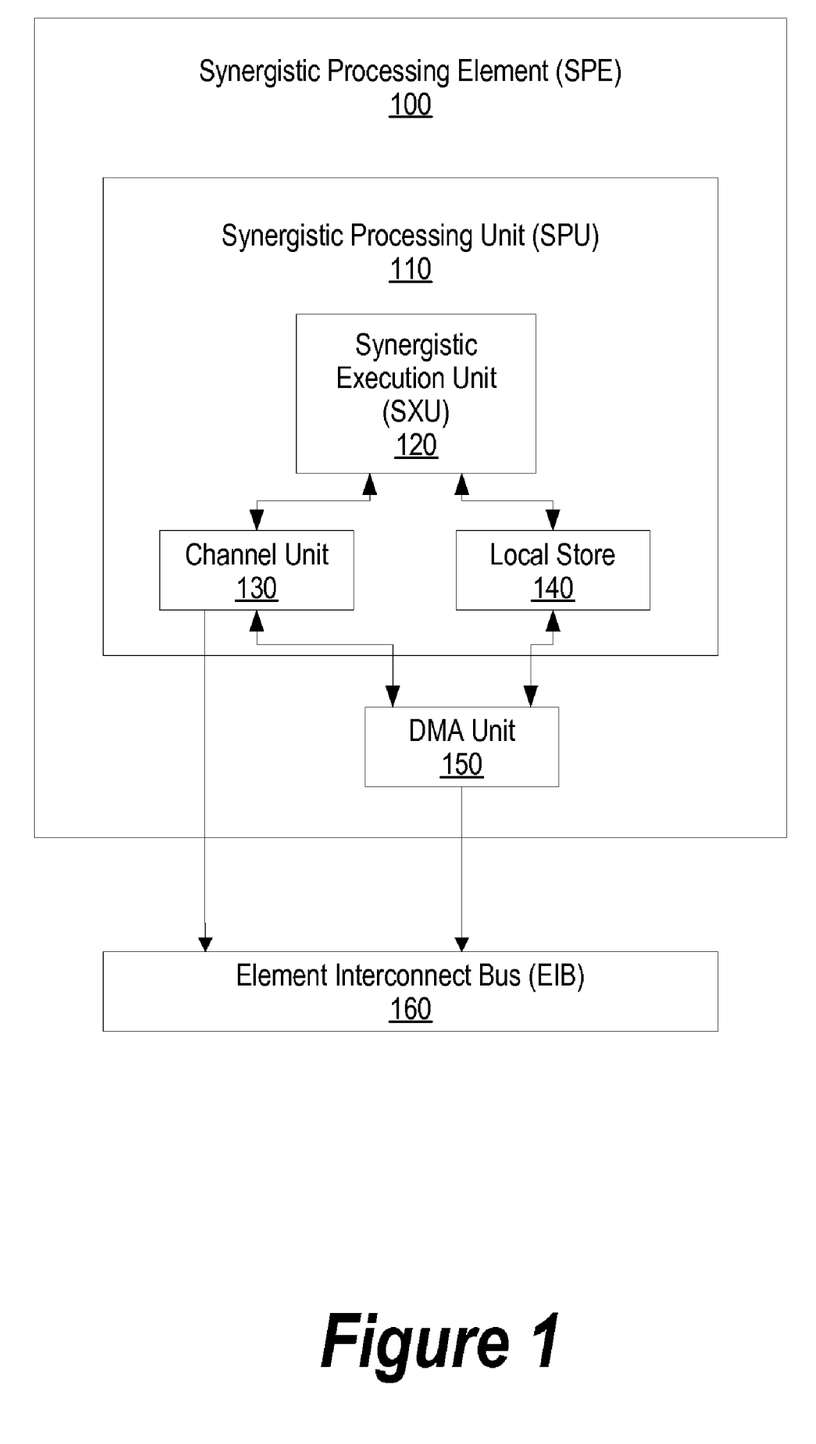
FIG. 1 is a high level drawing of a synergistic processing element that is capable of narrow read/write memory accesses and wide read/write memory accesses.

FIG. 1 is a high level drawing of a synergistic processing element that is capable of narrow read/write memory accesses and wide read/write memory accesses. Synergistic processing element (SPE) 100 includes synergistic processing unit (SPU) 110 and DMA unit 150. SPU 110 includes synergistic execution unit 120, channel unit 130, and local store 140.

SXU 120 accesses local store 140 for both instruction fetch and load/store operations. During instruction fetch operations, SPU 110 executes a wide read memory access, whereby SXU 120 receives 128 bytes of data from local store 140. During load/store operations, SPU 110 executes a narrow read/write memory access, whereby SXU 120 reads/writes 16 bytes of data from/to local store 140.

SPU 110 uses channel unit 130 to program DMA unit 150. DMA unit 150 reads/writes DMA read/write operations from/to local store 140. Local store 140 includes a write accumulation buffer and a read latch, whereby each of these accommodate 128 bytes of data. During DMA write requests, DMA unit 150 provides an 8-byte DMA write operation to the write accumulation buffer. When the write accumulation buffer receives sixteen consecutive DMA write operations, SPU 110 performs a wide write memory access and loads the contents of the write accumulation buffer into memory.

A similar scenario exists for DMA read operations. During a DMA read request, SPU 110 performs a wide read memory access and loads the read latch with sixteen 8-byte DMA read operations. In turn, the DMA data is written to EIB 160 over sixteen different instruction cycles. As a result, since the read latch stores sixteen processor cycles worth of DMA data, the memory bank is free to perform load/store operations or instruction fetch operations during fifteen instruction cycles (see FIGS. 2-10 for further details).

Figure 2:
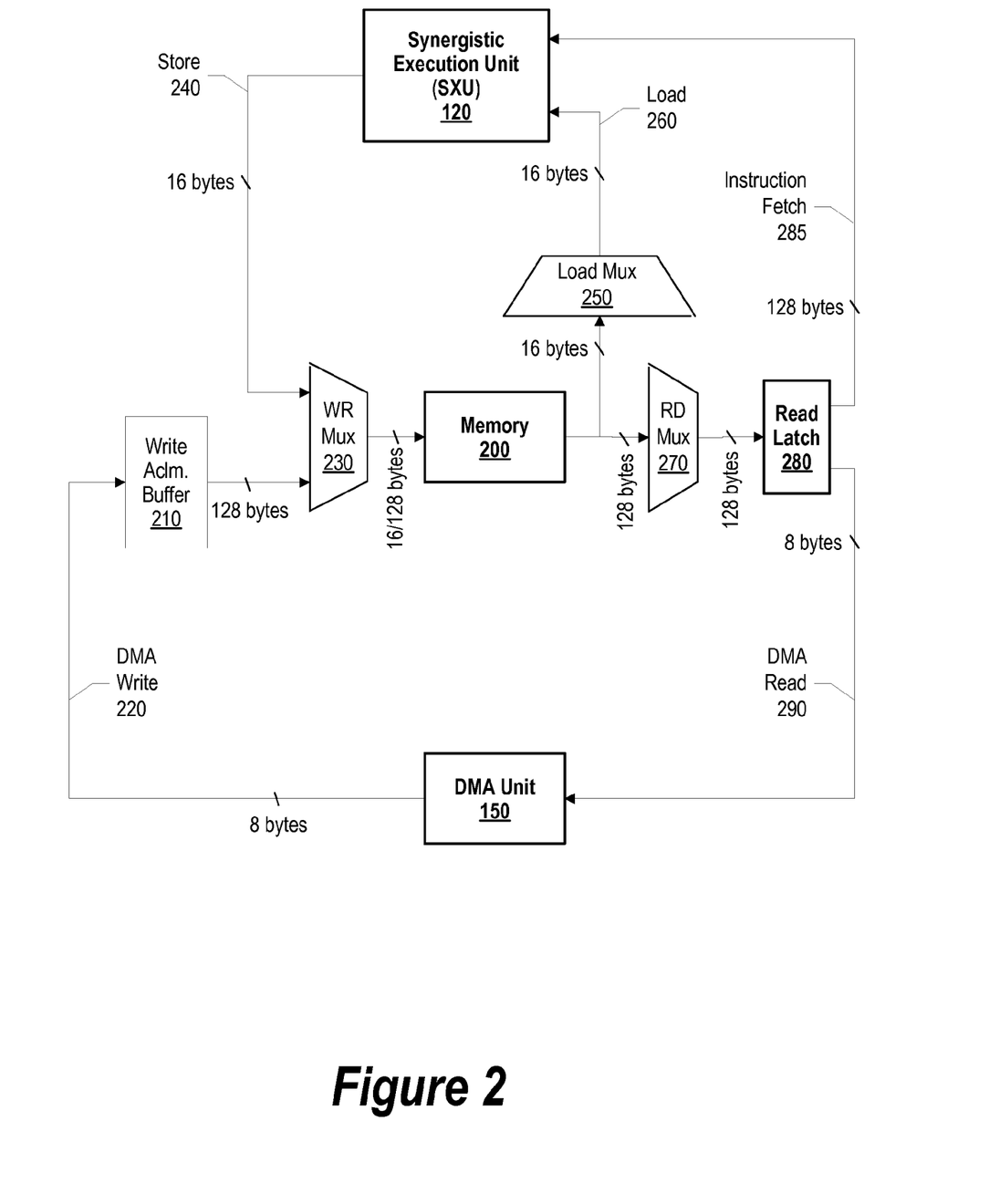
FIG. 2 is a diagram showing a system capable of performing narrow read/write memory accesses and wide read/write memory accesses to the same memory.

FIG. 2 is a diagram showing a system capable of performing narrow read/write memory accesses and wide read/write memory accesses to the same memory. The system may process 16 byte load/store requests using a narrow read/write memory access. In addition, the system may also process 128 byte DMA and instruction fetch requests using a wide read/write memory access.

FIG. 2 shows synergistic execution unit (SXU) 120 and DMA unit 150, which are the same as that shown in FIG. 1. FIG. 2 also includes details of local store 140 that is shown in FIG. 1, which are write accumulation buffer 210, write multiplexer 230, memory 200, load multiplexer 250, read multiplexer 270, and read latch 280.

While processing a "store" request, write multiplexer 230 is configured to receive 16 bytes of store data (i.e. store 240) from SXU 120. The 16 bytes of store data are loaded into memory 200 using a narrow write memory access. While processing a "load" request, load multiplexer 250 is configured to receive 16 bytes of load data from memory 200 and provide the load data to SXU 120 (i.e. load 260) (see FIG. 9 and corresponding text for further details regarding load/store operations).

Instruction fetch requests and DMA requests are performed using wide memory accesses (e.g. 128 bytes of data). While processing an instruction fetch request, read multiplexer 270 is configured to receive 128 bytes of instruction fetch data from memory 200 and provide it to read latch 280. In turn, SXU 120 retrieves the instruction fetch data from read latch 280 (i.e. instruction fetch 285) (see FIG. 10 and corresponding text for further details regarding instruction fetch requests).

In order to maximize system performance, processing DMA requests entails reading and writing multiple DMA data from/to memory in one instruction cycle. DMA read or write bandwidth is 8 bytes per cycle. This invention uses write accumulation buffer 210 and read latch 280 to accumulate and store sixteen DMA operations such that memory 200 is accessed one time every sixteen instruction cycles for DMA requests (see FIG. 4A, 4B, 5A, 5B and corresponding text for further details). During DMA write operations, DMA unit 150 sends DMA write 220 (8 bytes) to write accumulation buffer 210. Write accumulation buffer 210 stores DMA write 220, and determines whether it has received sixteen consecutive DMA write operations (see FIG. 6 and corresponding text for further details regarding DMA write quantity tracking).

Once write accumulation buffer 210 determines that it has received sixteen consecutive DMA write operations, the system schedules a wide write memory access to memory 200. In turn, write multiplexer 230 is configured to receive DMA data from write accumulation buffer 210, which is loaded into memory 200 during a single instruction cycle. By loading sixteen consecutive DMA write operations in one instruction cycle, memory 200 is available to process load/store or instruction fetch requests during fifteen other instruction cycles. For example, a conventional single port memory may be utilized on a cycle by cycle basis as follows:

"lslrrrrrrrrrrrrrrrslwwwwwwwwwwwwwwww"

where each character corresponds to an instruction cycle and l's are loads, s's are stores, r's are an 8 byte DMA read, and w's are and 8 byte DMA write. Using the invention described herein, a conventional single port memory may be utilized on a cycle by cycle basis as follows:

"lslRslW"

where R's are a 128 byte DMA read (wide read) and W's are a 128 byte DMA write (wide write). As can be seen, since each character corresponds to a processor cycle, the second sequence completes in significantly fewer processor cycles and thus, allows significantly improved processor performance (see FIGS. 4A, 4B, 5A, 5B, and corresponding text for further details).

During DMA read operations, the system configures read multiplexer 270 to receive a wide read memory access from memory 200 and load it into read latch 280. The wide read memory access includes sixteen processor cycles worth of DMA data. In turn, read latch 280 provides sixteen processor cycles worth of DMA data (i.e. DMA read 290) to DMA unit 150.

Figure 3:
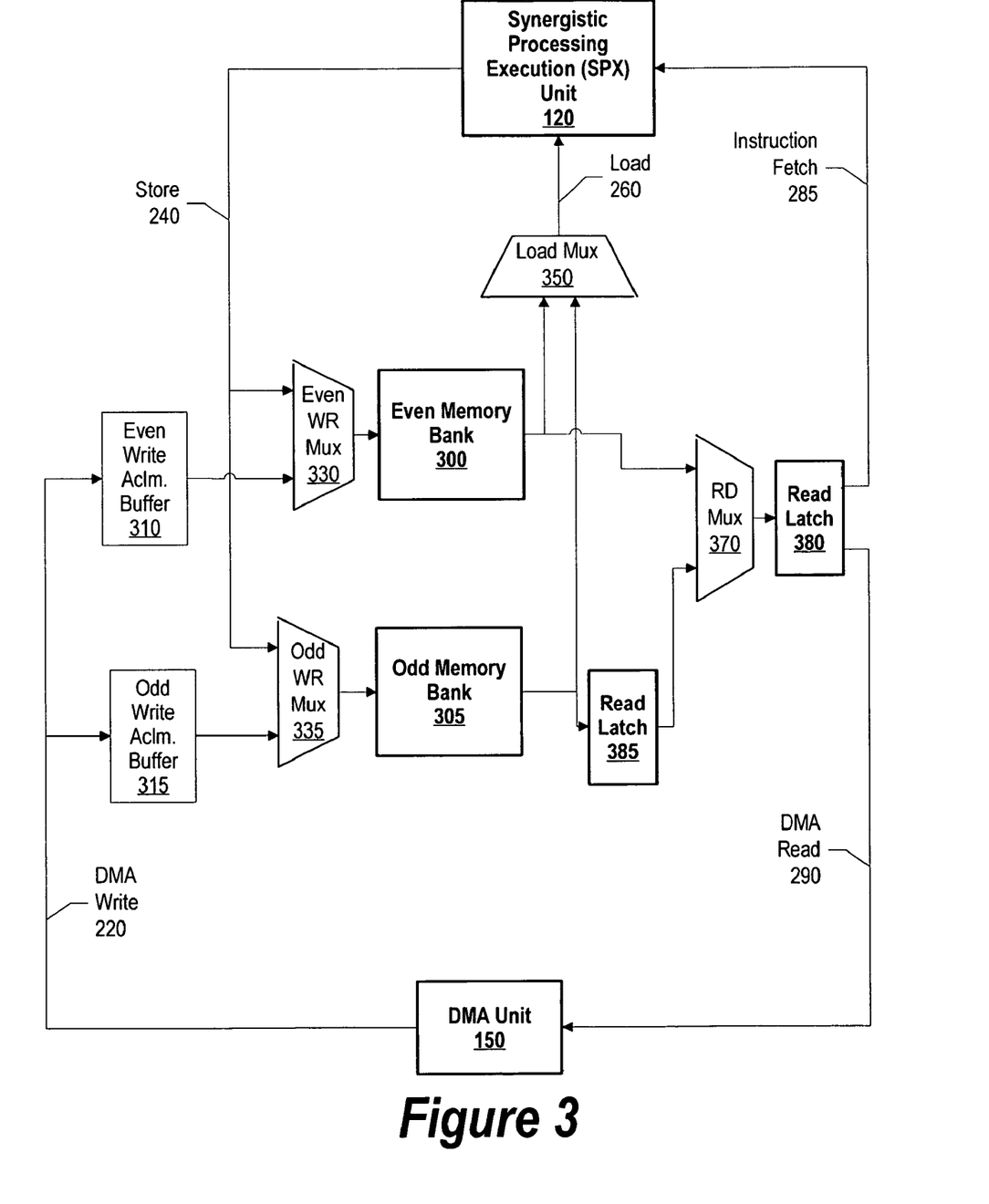
FIG. 3 is a diagram showing a system capable of performing narrow read/write memory accesses and wide read/write memory accesses in a split accumulation latch configuration.

FIG. 3 is a diagram showing a system capable of performing narrow read/write memory accesses and wide read/write memory accesses in a split accumulation latch configuration. FIG. 3 is similar to FIG. 2 with the exception that FIG. 3 includes two memory banks for split accumulation latch capability instead of one memory bank that is shown in FIG. 2. The benefit of this organization is that only a 64 byte wide bus is connected to the instruction unit and the DMA unit.

FIG. 3 includes even memory bank 300 and odd memory bank 305. While processing a "store" request, write multiplexer 330 or 335 is configured to receive 16 bytes of store data from SXU 120 (i.e. store 240). The 16 bytes of store data 240 are loaded into memory banks 300 or 305 using a narrow write memory access. While processing a "load" request, load multiplexer 350 is configured to receive 16 bytes of load data from even memory bank 300 or odd memory bank 305, and load multiplexer 350 provides the load data to SXU 120 (i.e. load 260). SXU 120, store 240, and load 260 are the same as that shown in FIG. 2.

Instruction fetch requests and DMA requests are still performed using wide memory accesses in a split accumulation latch configuration (e.g. 128 bytes of data). While processing an instruction fetch request, read multiplexer 370 is configured to receive 64 bytes of instruction fetch data from even memory bank 300 and provide it to read latch 380. During the same instruction cycle, read latch 385 receives 64 bytes of instruction fetch data from odd memory bank 305. SXU 120 retrieves the "even memory bank" instruction fetch data from read latch 280 (i.e. instruction fetch 285). Once SXU 120 retrieves all of the even memory bank data from read latch 380, read multiplexer 370 is configured to receive odd memory bank instruction fetch data from read latch 385 and provide it to read latch 380. In turn, SXU 120 retrieves the odd memory bank data from read latch 380.

During DMA write operations, DMA unit 150 sends DMA write 220 to write accumulation buffers 310 and 315. Each of the write accumulation buffers shown FIG. 3 is able to accumulate 64 bytes of DMA write data. When the system determines that the write accumulation buffers have received sixteen total DMA write operations (128 bytes total), the system schedules a wide write memory access to memory banks 300 and 305. In turn, write multiplexers 330 and 335 are configured to receive DMA data from write accumulation buffers 310 and 315, respectively. The DMA data is then loaded into memory banks 300 and 305 during a single instruction cycle.

DMA read requests are similar to those of instruction fetch requests in handling the configuration of the read latches. During DMA read operations, read multiplexer 370 is configured to receive 64 bytes of DMA read data from even memory bank 300 and provide it to read latch 380. During the same instruction cycle, read latch 385 receives 64 bytes of DMA read data from odd memory bank 305. Read latch 380 provides the even memory bank DMA data to DMA unit 150. Once DMA unit 150 receives each of the DMA read data included in the even memory bank data, read multiplexer 370 is configured to receive odd memory bank DMA read data from read latch 385 and provide it to read latch 380. In turn, DMA unit 150 retrieves the odd memory bank DMA read data from read latch 380.

Figure 4A:
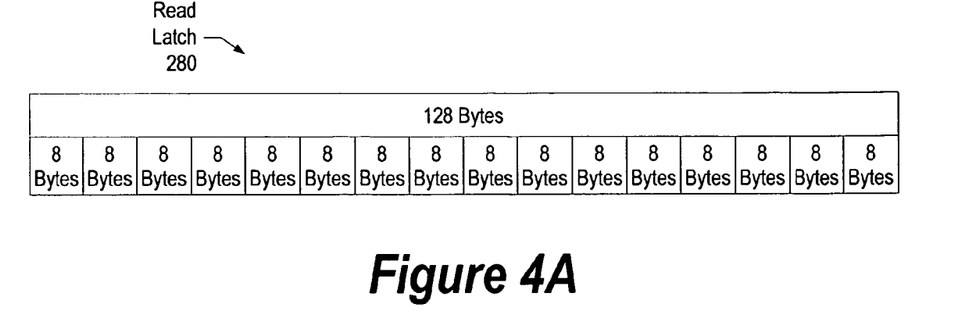
FIG. 4A is a diagram showing a read latch configuration.

FIG. 4A is a diagram showing a read latch configuration. FIG. 4A shows the configuration of read latch 280 that is shown in FIG. 2. Data is transferred from a memory bank to read latch 280 using a wide read memory access. The wide read memory access provides sixteen 8-byte operations (DMA read or instruction fetch), totaling 128 bytes. In a split accumulation latch configuration such as that shown in FIG. 3, two read latches exist, whereby each read latch receives eight 8-byte operations from memory.

Figure 4B:
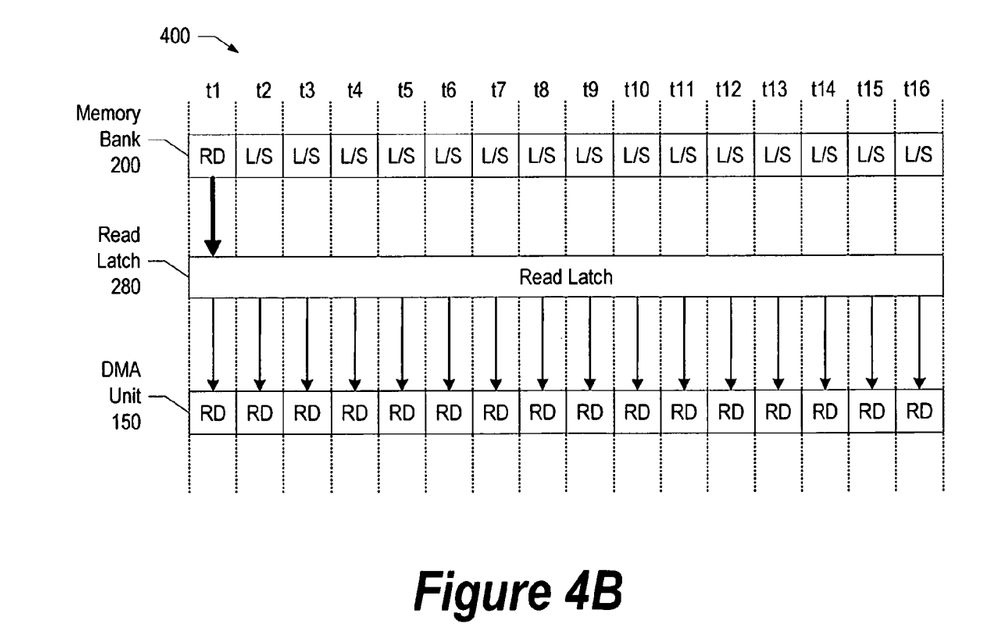
FIG. 4B is a diagram showing a single DMA memory read to a read latch, whereby the read latch provides DMA read operations to a DMA unit over sixteen different instruction cycles.

During DMA reads, the system reads out sixteen processor cycles worth of DMA data from memory during one instruction cycle, and then provides the DMA data to the DMA unit (see FIG. 4B and corresponding text for further details).

FIG. 4B is a diagram showing a single DMA memory read to a read latch, whereby the read latch provides DMA read operations to a DMA unit over sixteen different instruction cycles. Timeline 400 shows sixteen instruction cycles (t1-t16) and activity that exists during each instruction cycle for memory 200, read latch 280, and DMA unit 150, which are the same as those shown in FIG. 2.

At time t1, the system performs a wide read memory access and reads 128 bytes out of memory 200 and stores sixteen 8-byte DMA read operations in read latch 280. Also at time t1, read latch 280 provides one DMA read operation (8 bytes) to DMA unit 150. Since read latch 280 stores sixteen processor cycles worth of DMA data, read latch 280 also provides DMA read operations to DMA unit 150 at times t2 through t16. Therefore, during times t2-t16, memory 200 is free to perform load/store operations or instruction fetch operations. At time t17 (not shown), read latch 280 may receive another sixteen processor cycles worth of DMA data from memory 200.

In a split accumulation latch embodiment, two read latches, such as read latches 380 and 385 shown in FIG. 3, are each loaded at time t1 with eight 8-byte DMA read operations. Then, in this embodiment, one read latch provides its eight DMA read operations to DMA unit 150 over eight instruction cycles, and the other read latch provides its eight DMA operations to DMA unit 150 over eight more instruction cycles.

Figure 5A:
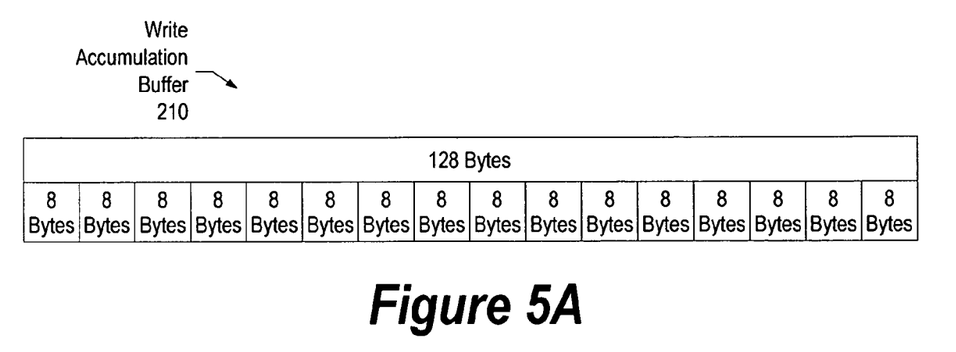
FIG. 5A is a diagram showing a write accumulation buffer configuration.

FIG. 5A is a diagram showing a write accumulation buffer configuration. FIG. 5A shows the configuration of write accumulation buffer 210 that is shown in FIG. 2. DMA unit 150 (shown in FIG. 2) sends 8-byte DMA write data to write accumulation buffer 210 over sixteen different instruction cycles, totaling 128 bytes of data.

Figure 5B:
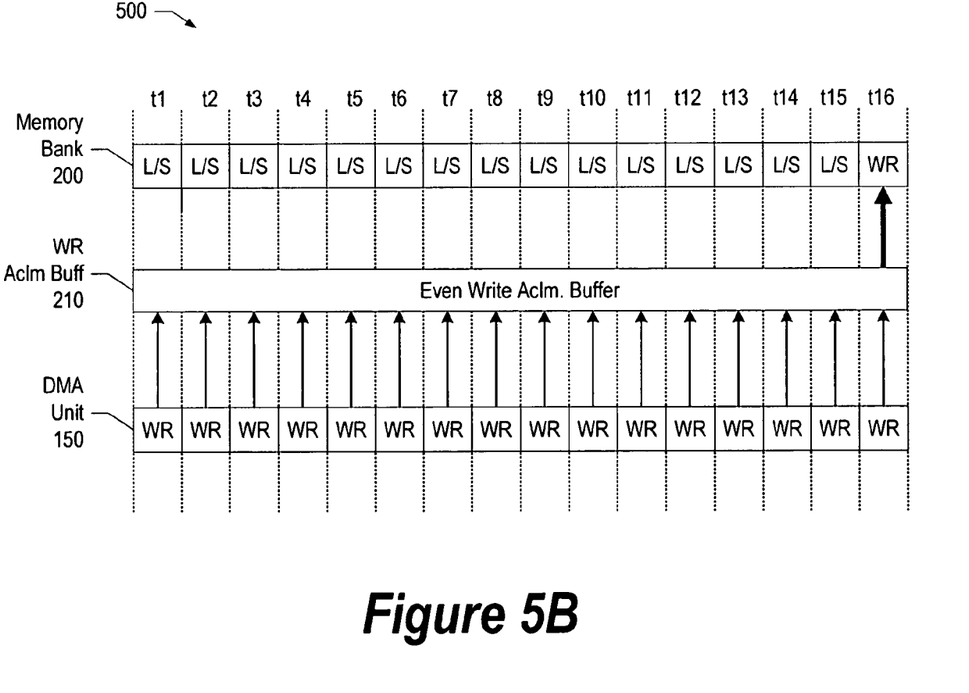
FIG. 5B is a diagram showing a single DMA memory write to memory that includes sixteen consecutive DMA write operations.
Figure 6:
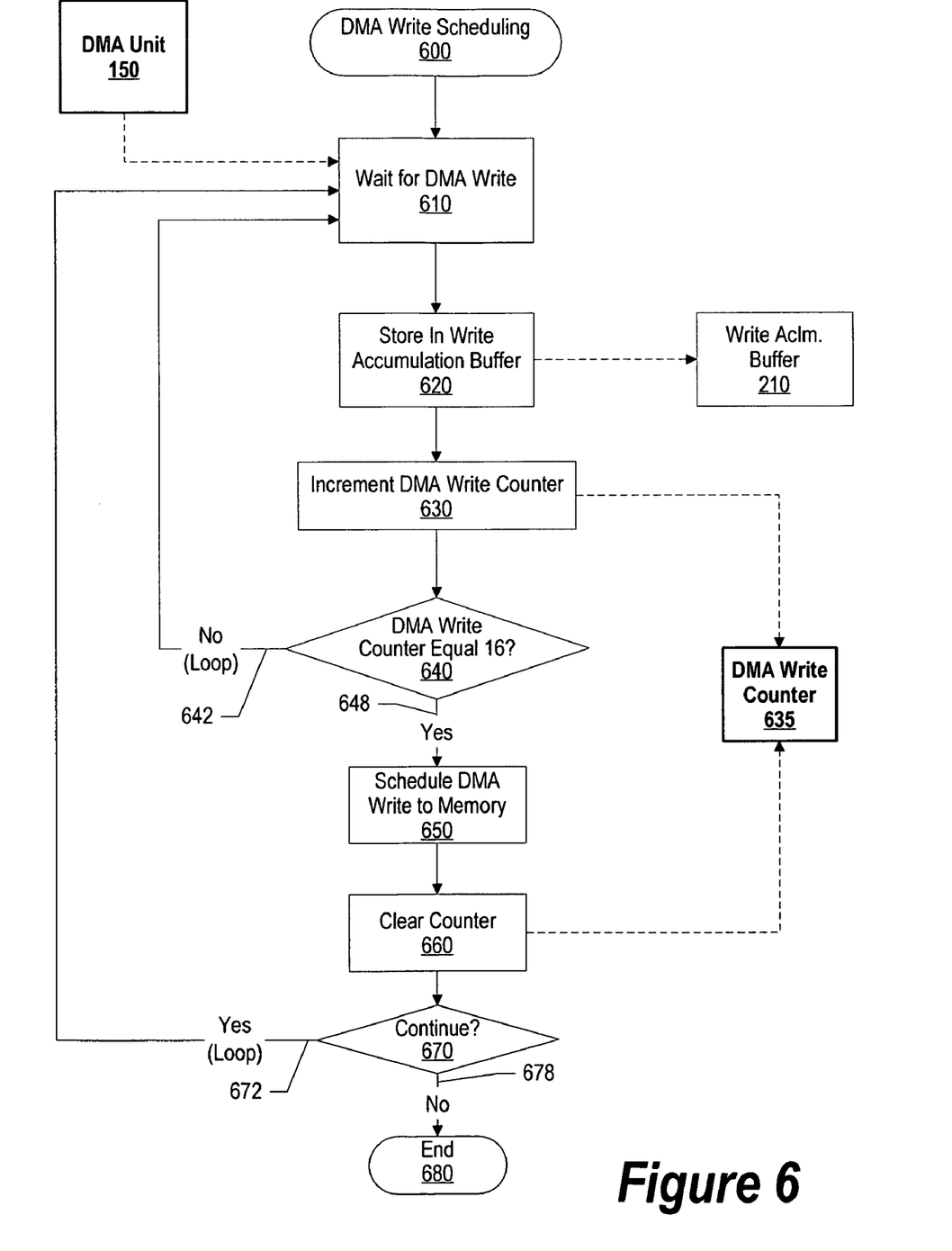
FIG. 6 is a flowchart showing steps taken in scheduling a DMA memory write operation.

Once write accumulation buffer receives the 128 bytes of data, the system schedules a wide write memory access to memory (see FIG. 6 and corresponding text for further details). The system then performs the wide write memory access to memory and loads the sixteen consecutive DMA write operations into memory during one clock cycle (see FIG. 5B and corresponding text for further details). In a split accumulation latch configuration such as that shown in FIG. 3, two write accumulation buffers receive eight DMA write operations from DMA unit 150, and then they load a total of sixteen consecutive DMA write operations into memory on one instruction cycle.

FIG. 5B is a diagram showing a single DMA memory write to memory that includes sixteen consecutive DMA write operations. Timeline 500 shows sixteen instruction cycles, and activity that exists during each instruction cycle for memory 200, write accumulation buffer 210, and DMA unit 150, which are the same as that shown in FIG. 2.

At time t1, DMA unit 150 stores a DMA write operation in write accumulation buffer 210. Also at time t1, memory 200 is free to perform a load/store operation or an instruction fetch operation. The same holds true at times t2 through t15 in that DMA unit 150 loads DMA write operations into write accumulation buffer 210, and memory 200 is free to perform load/store operations or instruction fetch operations. At time t16, DMA unit 150 loads its sixteenth DMA write operation into write accumulation buffer 210, and the system performs a wide write memory access and loads the contents of write accumulation buffer 210 into memory 200.

In a split accumulation latch embodiment, two write accumulation buffers, such as write accumulation buffers 310 and 315 shown in FIG. 3, load their contents into memory at time t16.

FIG. 6 is a flowchart showing steps taken in scheduling a DMA memory write operation. A system includes a write accumulator buffer that stores DMA writes until the buffer fills. Once the buffer fills, the system performs a wide write memory access to its memory. For example, if a DMA write is 8 bytes long, the write accumulation buffer receives sixteen DMA writes, and then the system performs a 128 byte write access to memory that includes the sixteen DMA writes (see FIGS. 5A, 5B and corresponding text for further details).

Processing commences at 600, whereupon processing waits for a DMA write request from DMA unit 150. DMA unit 150 is the same as that shown in FIG. 1. Once the system receives a DMA write request, the system stores the DMA write data in write accumulation buffer 210 (step 620). Write accumulation buffer 210 is the same as that shown in FIG. 1. At step 630, processing increments DMA write counter 635. DMA write counter 635 is used to track the number of DMA writes that have been stored in write accumulation buffer 210.

A determination is made as to whether DMA write counter 635 equals sixteen (decision 640). The example described in FIG. 6 is for a system that has a wide write memory access size sixteen times larger that its DMA writes, such as a 128 byte wide write memory access with an 8-byte DMA write. As one skilled in the art can appreciate, the value reached by DMA write counter 635 depends upon the size of the systems' wide write memory access compared to the size of the systems DMA writes, and the ratio may be less than or greater than sixteen.

If DMA write counter 635 does not equal sixteen, decision 640 branches to "No" branch 642 which loops back to continue to process more DMA write requests. This looping continues until DMA write counter 635 reaches sixteen, at which point decision 640 branches to "Yes" branch 648. Processing schedules a wide write memory access to memory for the DMA writes that are stored in write accumulation buffer 210 (step 650), and processing clears DMA write counter 635 at step 660.

A determination is made as to whether to continue processing DMA write requests (decision 670). If processing should continue to process DMA write requests, decision 670 branches to "Yes" branch 672 which loops back to process more DMA write requests. This looping continues until processing should terminate, at which point decision 670 branches to "No" branch 678 whereupon processing ends at 680.

Figure 7:
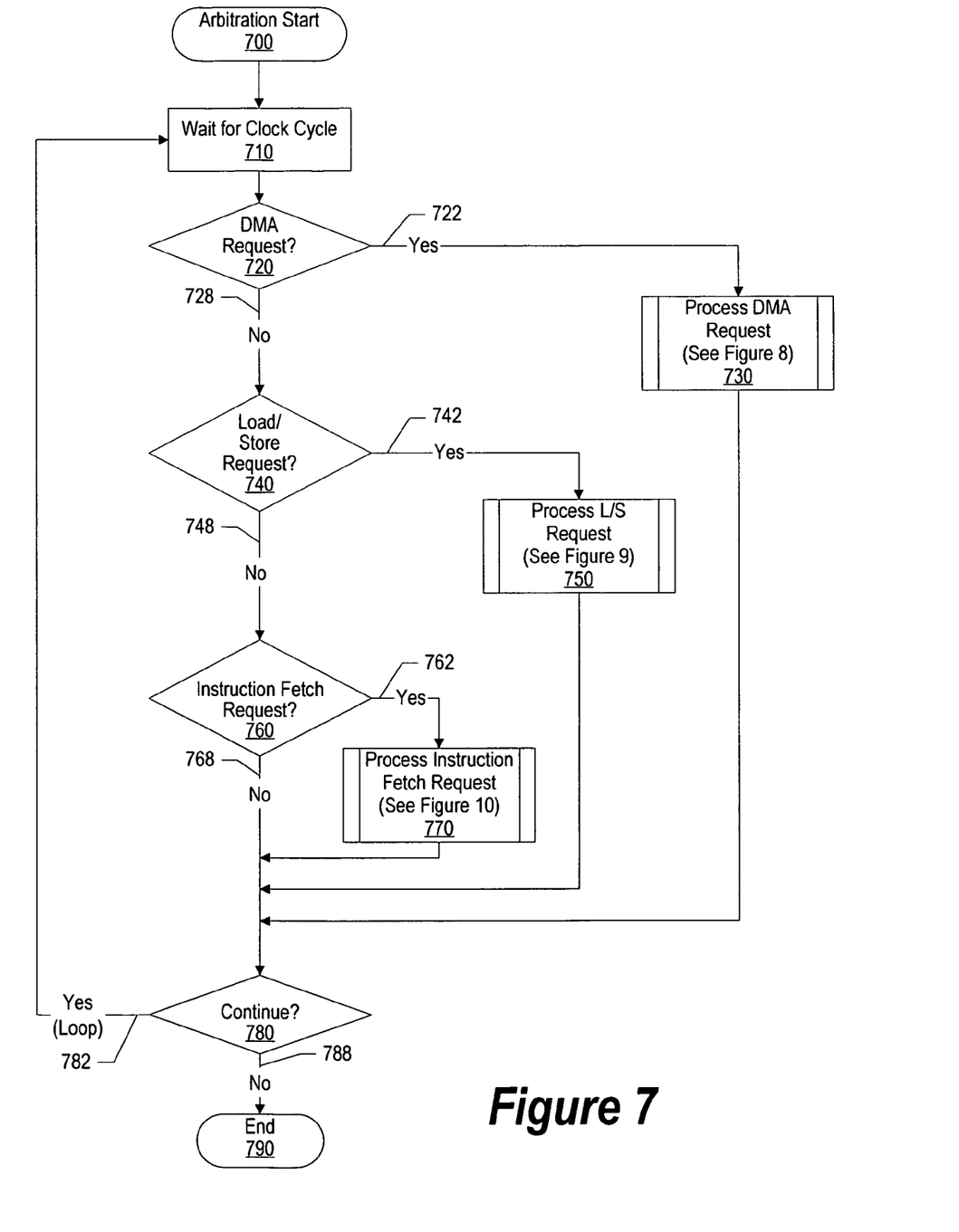
FIG. 7 is a high level flowchart showing steps taken in handling a memory request.

FIG. 7 is a high level flowchart showing steps taken in handling a memory request. In one embodiment, a system prioritizes memory access requests such that DMA requests are the highest priority, then load/store requests, then instruction fetch requests. The flowchart shown in FIG. 7 is an example of request prioritization that is discussed in the above embodiment.

Processing commences at 700, whereupon processing waits for an instruction cycle at step 710. Once processing detects an instruction cycle, a determination is made as to whether processing received a DMA request (decision 720). If processing received a DMA request, decision 720 branches to "Yes" branch 722 whereupon processing processes the DMA request and performs a wide write/read access to/from memory (pre-defined process block 730, see FIG. 8 and corresponding text for further details).

On the other hand, if processing has not received a DMA request, decision 720 branches to "No" branch 728 whereupon a determination is made as to whether processing received a load/store request (decision 740). If processing received a load/store request, decision 740 branches to "Yes" branch 742 whereupon processing processes the load/store request and performs a narrow write/read access to/from memory (pre-defined process block 750, see FIG. 9 and corresponding text for further details).

On the other hand, if processing has not received a load/store request, decision 740 branches to "No" branch 748 whereupon a determination is made as to whether processing received an instruction fetch request (decision 760). If processing received an instruction fetch request, decision 760 branches to "Yes" branch 762 whereupon processing processes the instruction fetch request and performs a wide read memory access from memory (pre-defined process block 770, see FIG. 10 and corresponding text for further details). On the other hand, if processing has not received an instruction fetch request, decision 760 branches to "No" branch 768.

A determination is made as to whether to continue memory request arbitration (decision 780). If processing should continue memory request arbitration, decision 780 branches to "Yes" branch 782 which loops back to process more memory access requests. This looping continues until processing should stop memory request arbitration, at which point decision 780 branches to "No" branch 788 whereupon processing ends at 790.

Figure 8:
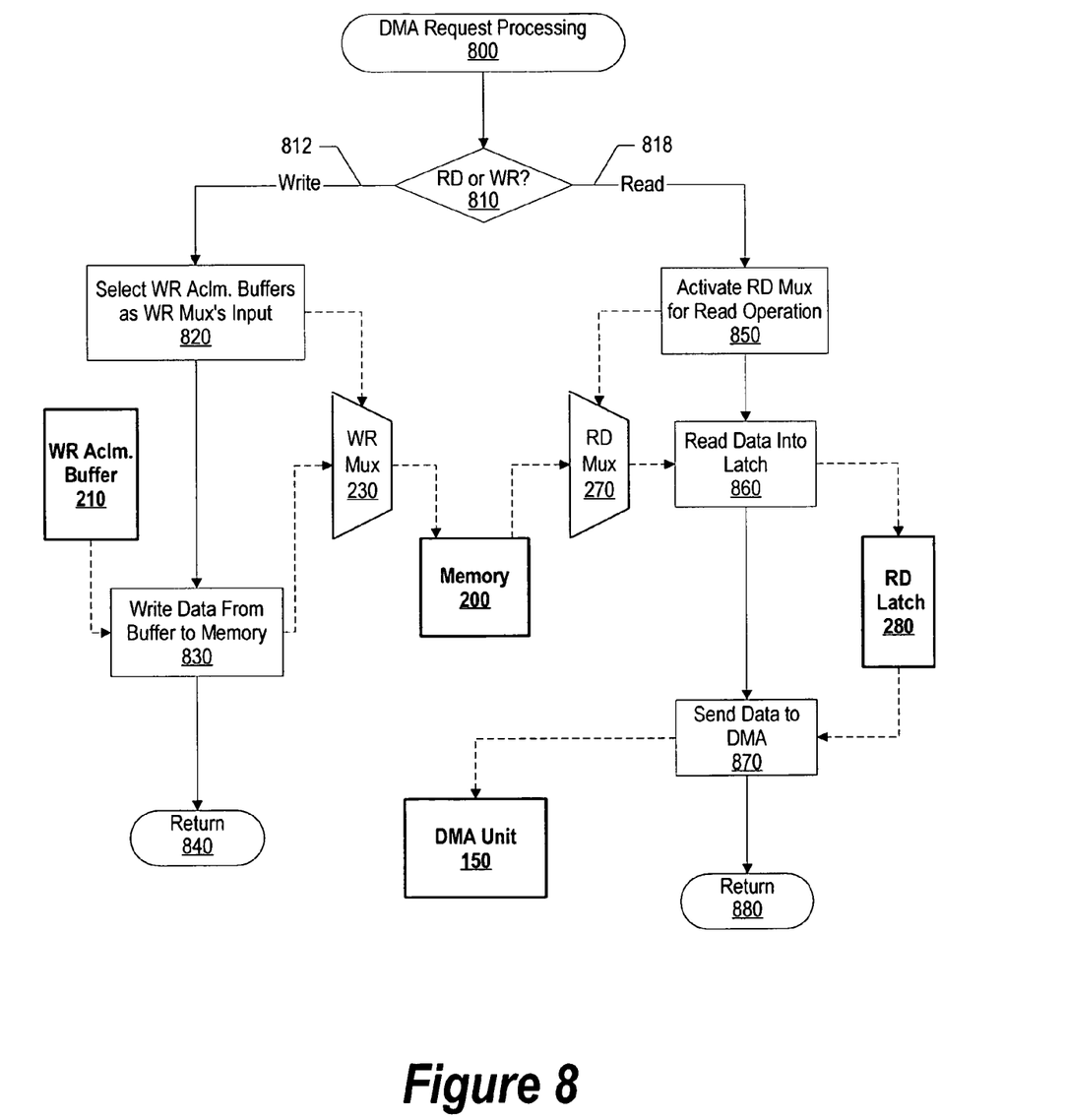
FIG. 8 is a flowchart showing steps taken in processing a DMA request.

FIG. 8 is a flowchart showing steps taken in processing a DMA request. DMA activity has higher priority over load/store and instruction fetch requests (see FIG. 7). In one embodiment, DMA requests may be scheduled to occur on every sixteenth instruction cycle, leaving fifteen instruction cycles to accommodate load/store requests and instruction fetch requests (see FIGS. 4A, 4B, 5A, 5B, and corresponding text for further details).

DMA request processing commences at 800, whereupon a determination is made as to whether the DMA request is a DMA read request or a DMA write request (decision 810). If it is a DMA write request, decision 810 branches to "Write" branch 812. Processing configures write accumulation buffer 210 write multiplexer 230 to accept data from write accumulation buffer 210 at step 820. Write accumulation buffer 210 and write multiplexer 230 are the same as that shown in FIG. 2.

At step 830, processing performs a wide write memory access to memory 200, whereby DMA write data from write accumulation buffer 210 is written to memory 200 through write multiplexer 230. The wide write memory access is one line (128 bytes) and includes sixteen DMA writes (8 bytes each). Processing returns at 840.

If the DMA request is a DMA read request, decision 810 branches to "Read" branch 818. Processing configures read multiplexer 270 to receive data from memory 200 and provide the data to read latch 280 (step 850). Read multiplexer 270 and read latch 280 are the same as that shown in FIG. 2. At step 860, processing performs a wide read memory access from memory 200, whereby DMA read data is read from memory 200 and stored in read latch 280 through read multiplexer 270. The DMA read data includes sixteen, 8 byte DMA reads.

Processing sends the sixteen DMA reads from read latch 280 to DMA unit 150 over sixteen different instruction cycles (step 870), and processing returns at 880.

Figure 9:
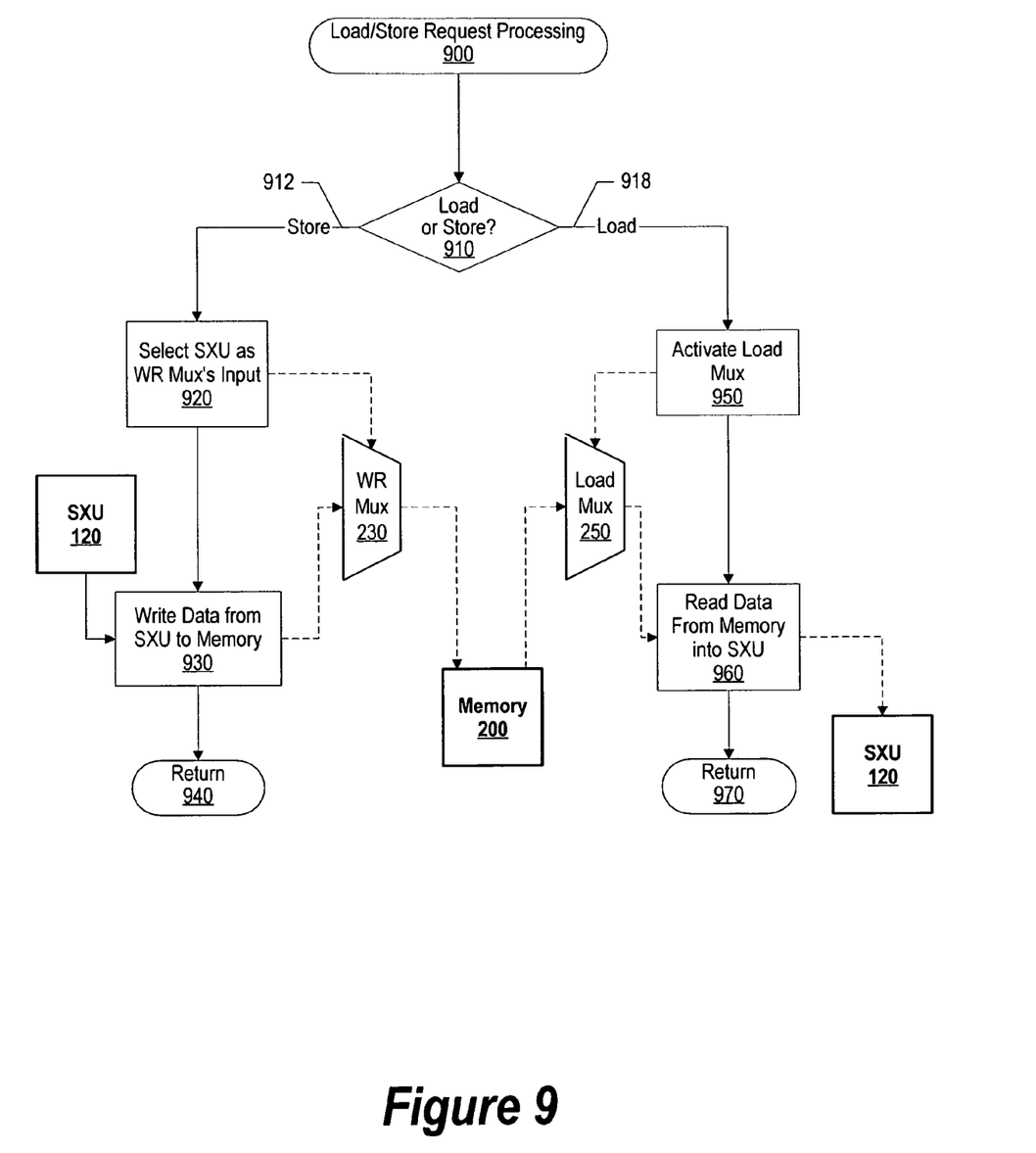
FIG. 9 is a flowchart showing steps taken in processing a load or store request.

FIG. 9 is a flowchart showing steps taken in processing a load or store request. Load and store requests are scheduled at a lower priority than DMA requests, but at a higher priority than instruction fetch requests (see FIG. 7 and corresponding text for further details regarding request prioritization).

Processing commences at 900, whereupon a determination is made as to whether the request is a load request or a store request (decision 910). If the request is a store request, decision 910 branches to "Store" branch 912. Processing configures write multiplexer 230 to receive data from synergistic execution unit (SXU) 120. SXU 120 and write multiplexer 230 are the same as that shown in FIG. 2.

At step 930, processing performs a narrow write access to memory 200, whereby store data from SXU 120 is written to memory 200 through write multiplexer 230. The narrow write access may be a quadword in length, or may be a single word in length. Processing returns at 940.

If the request is a load request, decision 910 branches to "Load" branch 918. Processing configures load multiplexer 250 to receive data from memory 200 and provide the data to SXU 120 (step 950). Load multiplexer 250 is the same as that shown in FIG. 2. At step 960, processing performs a narrow read memory access from memory 200, whereby load data is read from memory 200 and sent to SXU 120 through load multiplexer 250. Processing returns at 880.

Figure 10:
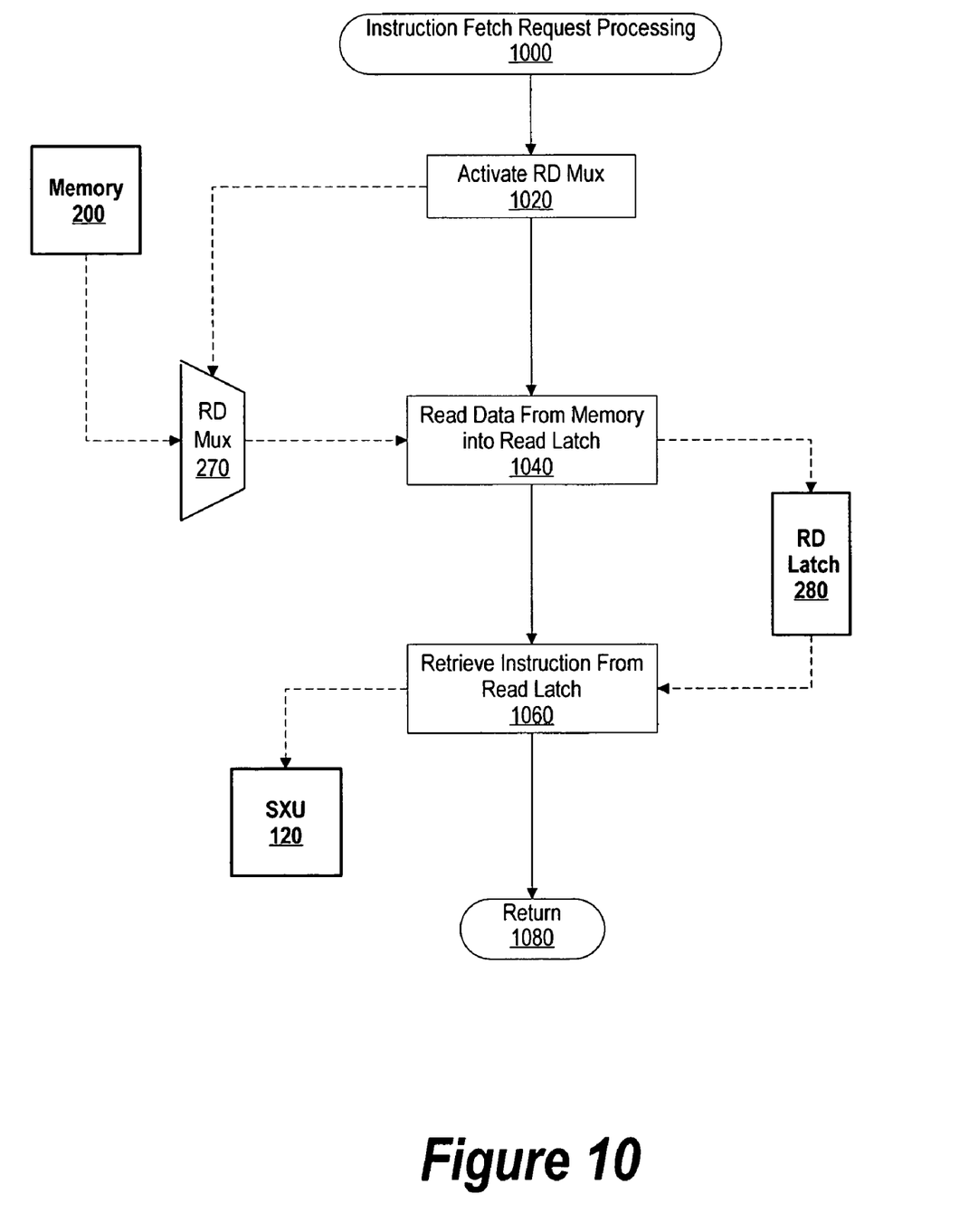
FIG. 10 is a flowchart showing steps taken in processing an instruction fetch request.

FIG. 10 is a flowchart showing steps taken in processing an instruction fetch request. In one embodiment, instruction fetch requests are at a lower priority than DMA requests and load/store requests. Processing commences at 1000, whereupon processing configures read multiplexer 270 to receive data from memory 200 and provide the data to read latch 280 (step 1020). Read multiplexer 270 and read latch 280 are the same as that shown in FIG. 2. At step 1040, processing performs a wide read memory access from memory 200, whereby instruction fetch data is read from memory 200 and stored in read latch 280 through read multiplexer 270.

Processing retrieves the instruction fetch data from read latch 280 and loads the data in synergistic execution unit (SXU) 120 at step 1060. SXU 120 is the same as that shown in FIG. 2. Processing returns at 1080.

Figure 11:
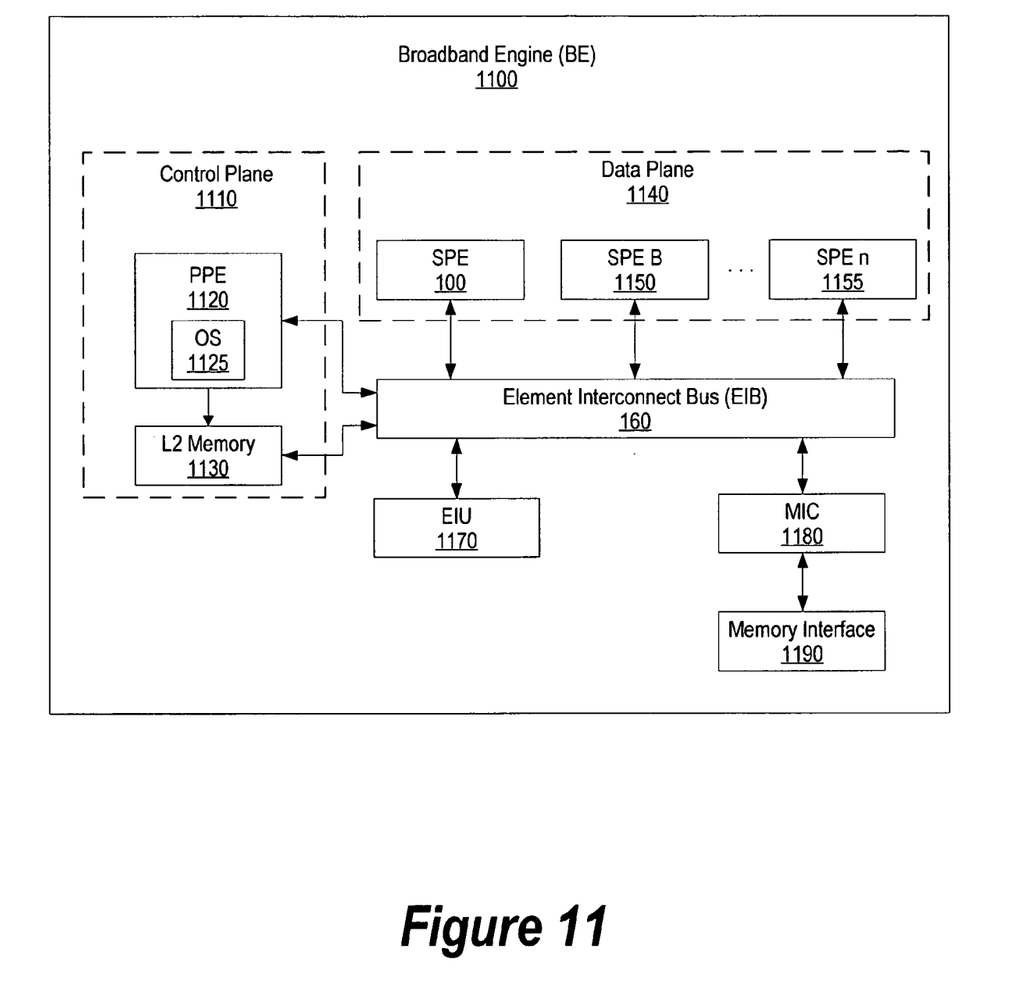
FIG. 11 is a block diagram of a computing device capable of implementing the present invention.

FIG. 11 is a block diagram of a computing device capable of implementing the present invention. The architecture shown in FIG. 11 includes heterogeneous processors that share a common memory and a common bus. Broadband Engine (BE) 1100 sends and receives information to/from external devices through element interconnect unit 1170, and distributes the information to control plane 1110 and data plane 1140 using element interconnect bus 160, which is the same as that shown in FIG. 1. Control plane 1110 manages BE 1100 and distributes work to data plane 1140.

In addition, element interconnect bus (EIU) 160 provides read and write requests to memory interface controller (MIC) 1180. Memory interface controller 1180 communicates the requests to memory interface 1190 that, in turn, communicates with external memory.

Control plane 1110 includes power processing element (PPE) 1120, which runs operating system (OS) 1125. For example, PPE 1120 may be a Power PC core that is embedded in BE 1100 and OS 1125 may be a Linux operating system. PPE 1120 manages a common memory map table for BE 1100. The memory map table corresponds to memory locations included in BE 1100, such as L2 memory 1130 as well as non-private memory included in data plane 1140.

Data plane 1140 includes Synergistic Processing Elements (SPE's) 100, 1150, and 1155. SPE 100 is the same as that shown in FIG. 1. Each SPE is used to process data information and each SPE may have different instruction sets. For example, BE 1100 may be used in a wireless communications system and each SPE may be responsible for separate processing tasks, such as modulation, chip rate processing, encoding, and network interfacing. In another example, each SPE may have identical instruction sets and may be used in parallel to perform operations benefiting from parallel processes. Each SPE includes a synergistic processing unit (SPU), which is a processing core, such as a digital signal processor, a microcontroller, a microprocessor, or a combination of these cores.

SPE 100, 1150, and 1155 are connected to processor element bus 1160, which passes information between control plane 1110, data plane 1140, and input/output 1170. Bus 160 is an on-chip coherent multi-processor bus. EIU 1170 includes flexible input-output logic, which dynamically assigns interface pins to input-output controllers based upon peripheral devices that are connected to BE 1100.

While the computer system described in FIG. 11 is capable of executing the processes described herein, this computer system is simply one example of a computer system. Those skilled in the art will appreciate that many other computer system designs are capable of performing the processes described herein.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A system comprising a memory that supports a narrow read/write memory access and a wide read/write memory access to a single memory space, wherein the system processes a load/store request that corresponds to the narrow read/write memory access that is a single 16 byte quad-word, and wherein the system processes a DMA request that at all times corresponds to the wide read/write memory access that is a single 128 byte line of the memory;
 - a write accumulation buffer that accumulates a plurality of DMA write operations over a plurality of instruction cycles, the plurality of DMA write operations corresponding to the wide write memory access that executes over a single instruction cycle; and
 - a multiplexer that provides the wide write memory access to the memory for the DMA request and provides the narrow write memory access to the memory for the store request.

2. The system of claim 1 wherein the wide read/write memory access corresponds to an instruction fetch request.

3. The system of claim 2 wherein the system is effective to prioritize the requests in the order of the DMA request, then the load/store request, and then the instruction fetch request.

4. The system of claim 1 further comprising:
 - a read latch that receives DMA data from the wide read memory access, the DMA data corresponding to a plurality of DMA read operations; and
 - wherein the read latch provides the plurality of DMA read operations to a DMA unit over a plurality of instruction cycles.

5. The system of claim 1 wherein the memory is used in a processing element architecture.

6. The system of claim 1 wherein the system supports split accumulation latch capability and a plurality of memory banks.

7. The system of claim 6 wherein, during the narrow read/write memory access that corresponds to the load/store request, the system accesses one of the plurality of memory banks, and wherein the remaining plurality of memory banks are not accessed.

8. The system of claim 1 wherein the wide read/write memory access corresponds to cache line cast-out or reload operations.

9. The system of claim 1 further comprising:
 - a first read latch to receive data from the single memory space and from a second read latch during a wide read operation, wherein the second read latch receives data from the single memory space and stages the data for the first read latch.

10. The system of claim 1 further comprising:
 - a first processor type; and
 - one or more second processor types, wherein the memory is included in the second processor types.

11. A program product comprising computer readable code stored in computer memory, the computer readable code being effective to:
 - receive a memory request;
 - determine whether the memory request is a store request, wherein the store request corresponds to a narrow write memory access to a memory that is a single 16 byte quad-word, or whether the memory request is a DMA write request, wherein the DMA request at all times corresponds to a wide write memory access to the memory that is a single 128 byte line of the memory;
 - in response to determining that the memory request is the store request, instruct a multiplexer to provide the narrow write memory access to the memory and perform the narrow write memory access to the memory through the multiplexer; and
 - in response to determining that the memory request is the DMA write request, instruct the multiplexer to provide the wide write memory access to the memory in order to perform the wide write memory access to the memory through the multiplexer, wherein during the wide write memory access, accumulate a plurality of DMA write operations over a plurality of instruction cycles, the plurality of DMA write operations corresponding to the wide write memory access that executes over a single instruction cycle.

12. The program product of claim 11 wherein the wide read/write memory access corresponds to an instruction fetch request, the computer program code further effective to:
 - prioritize the requests in the order of the DMA request, then the load/store request, and then the instruction fetch request.

13. A computer-implemented method comprising:
 - receiving a memory request;
 - determining whether the memory request is a store request, wherein the store request corresponds to a narrow write memory access to a memory that is a single 16 byte quad-word, or whether the memory request is a DMA write request, wherein the DMA write request at all times corresponds to a wide write memory access to the memory that is a single 128 byte line of the memory;
 - in response to determining that the memory request is the store request, instructing a multiplexer to provide the narrow write memory access to the memory and perform the narrow write memory access to the memory through the multiplexer; and
 - in response to determining that the memory request is the DMA write request, instructing the multiplexer to provide the wide write memory access to the memory in order to perform the wide write memory access to the memory through the multiplexer, wherein during the wide write memory access, accumulating a plurality of DMA write operations over a plurality of instruction cycles, the plurality of DMA write operations corresponding to the wide write memory access that executes over a single instruction cycle.

14. The method of claim 13 wherein the wide read/write memory access corresponds to an instruction fetch request.

15. The method of claim 14 further comprising:
 - prioritizing the requests in the order of the DMA write request, then the store request, and then the instruction fetch request.

16. The method of claim 13 further comprising:
 - utilizing a read latch that receives DMA data for the wide read memory access, the DMA data corresponding to a plurality of DMA read operations; and
 - wherein the read latch provides the plurality of DMA read operations to a DMA unit over a plurality of instruction cycles.

17. The method of claim 13 wherein the memory is used in a processing element architecture.

18. The method of claim 13 wherein the method supports split accumulation latch capability and a plurality of memory banks.

19. The method of claim 18 wherein, during the narrow write memory access that corresponds to the store request, the method further comprising:
   accessing one of the plurality of memory banks, and wherein the remaining plurality of memory banks are not accessed.

20. The method of claim 13 wherein the wide write memory access corresponds to cache line cast-out or reload operations.

* * * * *

UNITED STATES PATENT AND TRADEMARK OFFICE
CERTIFICATE OF CORRECTION

PATENT NO.      : 7,617,338 B2
APPLICATION NO. : 11/050040
DATED           : November 10, 2009
INVENTOR(S)     : Dhong et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 965 days.

Signed and Sealed this

Nineteenth Day of October, 2010

David J. Kappos
*Director of the United States Patent and Trademark Office*